(12) United States Patent
Tametani

(10) Patent No.: US 10,202,787 B2
(45) Date of Patent: Feb. 12, 2019

(54) RETAINING FEATURE FOR AN ADJUSTMENT ROD CLIP

(71) Applicant: INTEVA PRODUCTS, LLC, Troy, MI (US)

(72) Inventor: Yoshihiko Tametani, Kanagawa (JP)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 15/684,049

(22) Filed: Aug. 23, 2017

(65) Prior Publication Data

US 2018/0058111 A1 Mar. 1, 2018

(30) Foreign Application Priority Data

Aug. 23, 2016 (JP) ................................. 2016-162434

(51) Int. Cl.
| | |
|---|---|
| *F16L 55/035* | (2006.01) |
| *E05B 79/16* | (2014.01) |
| *F16B 2/10* | (2006.01) |
| *F16B 2/22* | (2006.01) |

(52) U.S. Cl.
CPC ............... *E05B 79/16* (2013.01); *F16B 2/10* (2013.01); *F16B 2/22* (2013.01); *E05Y 2900/531* (2013.01)

(58) Field of Classification Search
CPC ....... F16L 3/00; F16L 3/08; F16L 3/12; Y10T 24/44274
USPC .... 248/71, 68.1, 73, 74.2, 74.4, 74.1, 230.1, 248/230.4, 230.5, 230.6, 230.7, 231.51, 248/231.61, 231.71, 231.81
See application file for complete search history.

(56) References Cited

U.S. PATENT DOCUMENTS

| | | | | |
|---|---|---|---|---|
| 4,635,498 A | * | 1/1987 | Zimmermann | F16B 5/126 248/74.1 |
| 5,597,980 A | * | 1/1997 | Weber | H02G 3/0418 123/143 C |
| 5,601,262 A | * | 2/1997 | Wright | F16L 3/04 248/74.1 |
| 5,704,573 A | * | 1/1998 | de Beers | F16L 3/13 248/73 |
| 5,762,299 A | * | 6/1998 | Motsch | F16L 3/04 248/65 |
| 7,404,548 B2 | * | 7/2008 | Kwilosz | B60R 16/0215 248/71 |
| 7,523,898 B1 | * | 4/2009 | Barry | F16B 5/0685 174/164 |
| 7,866,612 B2 | * | 1/2011 | Doi | H02G 3/30 248/67.5 |
| 2002/0000499 A1 | * | 1/2002 | Aoki | F16L 3/10 248/74.4 |

(Continued)

*Primary Examiner* — Terrell L McKinnon
*Assistant Examiner* — Michael McDuffie
(74) *Attorney, Agent, or Firm* — Cantor Colburn LLP

(57) ABSTRACT

An adjustment rod assembly includes an adjustment rod clip with a top portion, a bottom portion, and a clip connector coupling the top portion and the bottom portion, a lever to receive the bottom portion of the adjustment rod clip, and a cover, including a recessed cover to receive the top portion of the adjustment rod clip, and at least one retaining feature extending from the recessed cover portion, wherein the at least one retaining feature releasably engages the adjustment rod clip to prevent the rotation and translation of the adjustment rod clip.

12 Claims, 3 Drawing Sheets

(56) References Cited

U.S. PATENT DOCUMENTS

| | | | | |
|---|---|---|---|---|
| 2004/0108421 A1* | 6/2004 | Yuta | ............... | B60N 3/046 248/71 |
| 2004/0232286 A1* | 11/2004 | Newkirk | ............ | A61G 7/0503 248/68.1 |
| 2012/0217355 A1* | 8/2012 | Geiger | ............... | F16L 3/12 248/74.2 |
| 2016/0003377 A1* | 1/2016 | Denner | ............. | F16L 3/1075 248/74.1 |

\* cited by examiner

RETAINING FEATURE FOR AN ADJUSTMENT ROD CLIP

CROSS REFERENCE TO RELATED APPLICATIONS

This application claims priority under 35 U.S.C. § 119 to following Japanese Patent application no. 2016-162434, filed on Aug. 23, 2016, the entire contents of which are incorporated herein by reference thereto.

BACKGROUND

The present disclosure relates to latch assemblies, more particularly to latch assemblies for use in automobiles.

Latch assemblies for use in automobile doors can be assembled to connect an outside handle to the latch mechanism. In such uses, an installer may inadvertently rotate the adjustment rod clip or the lever of the latch mechanism during installation.

Accordingly, it is desirable to provide a retention feature to prevent the rotation of the adjustment rod clip and the translation of the lever during installation.

BRIEF SUMMARY

According to one embodiment, a cover to retain an open adjustment rod clip disposed within a lever during assembly includes a recessed cover to receive the open adjustment rod clip, and at least one retaining feature extending from the recessed cover portion, wherein the at least one retaining feature releasably engages the open adjustment rod clip to prevent the rotation and translation of the open adjustment rod clip.

In addition to one or more of the features described above, or as an alternative, further embodiments could include that the at least one retaining feature releasably engages the lever via the open adjustment rod clip.

In addition to one or more of the features described above, or as an alternative, further embodiments could include that the cover is formed from a polymer.

In addition to one or more of the features described above, or as an alternative, further embodiments could include that the at least one retaining feature is a plurality of retaining features.

According to one embodiment, an adjustment rod assembly includes an adjustment rod clip with a top portion, a bottom portion, and a clip connector coupling the top portion and the bottom portion, a lever to receive the bottom portion of the adjustment rod clip, and a cover, including a recessed cover to receive the top portion of the adjustment rod clip, and at least one retaining feature extending from the recessed cover portion, wherein the at least one retaining feature releasably engages the adjustment rod clip to prevent the rotation and translation of the adjustment rod clip.

In addition to one or more of the features described above, or as an alternative, further embodiments could include that the at least one retaining feature engages the top portion of the adjustment rod clip.

In addition to one or more of the features described above, or as an alternative, further embodiments could include that the at least one retaining feature engages the clip connector of the adjustment rod clip.

In addition to one or more of the features described above, or as an alternative, further embodiments could include that the adjustment rod clip receives an adjustment rod.

In addition to one or more of the features described above, or as an alternative, further embodiments could include that the bottom portion of the adjustment rod clip receives an adjustment rod interface portion of the adjustment rod.

In addition to one or more of the features described above, or as an alternative, further embodiments could include that the bottom portion of the adjustment rod clip engages the top portion of the adjustment rod clip to retain the adjustment rod.

In addition to one or more of the features described above, or as an alternative, further embodiments could include that the bottom portion of the adjustment rod clip engages the top portion of the adjustment rod clip via a locking feature.

In addition to one or more of the features described above, or as an alternative, further embodiments could include that the at least one retaining feature releasably engages the lever via the adjustment rod clip.

In addition to one or more of the features described above, or as an alternative, further embodiments could include that the cover is formed from a polymer.

In addition to one or more of the features described above, or as an alternative, further embodiments could include that the at least one retaining feature is a plurality of retaining features.

Other aspects, features, and techniques of the embodiments will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments provide retaining features to selectively retain an adjustment rod clip. Retaining features can prevent unintentional rotation and translation of the adjustment rod clip during assembly and/or installation.

Figure 1:
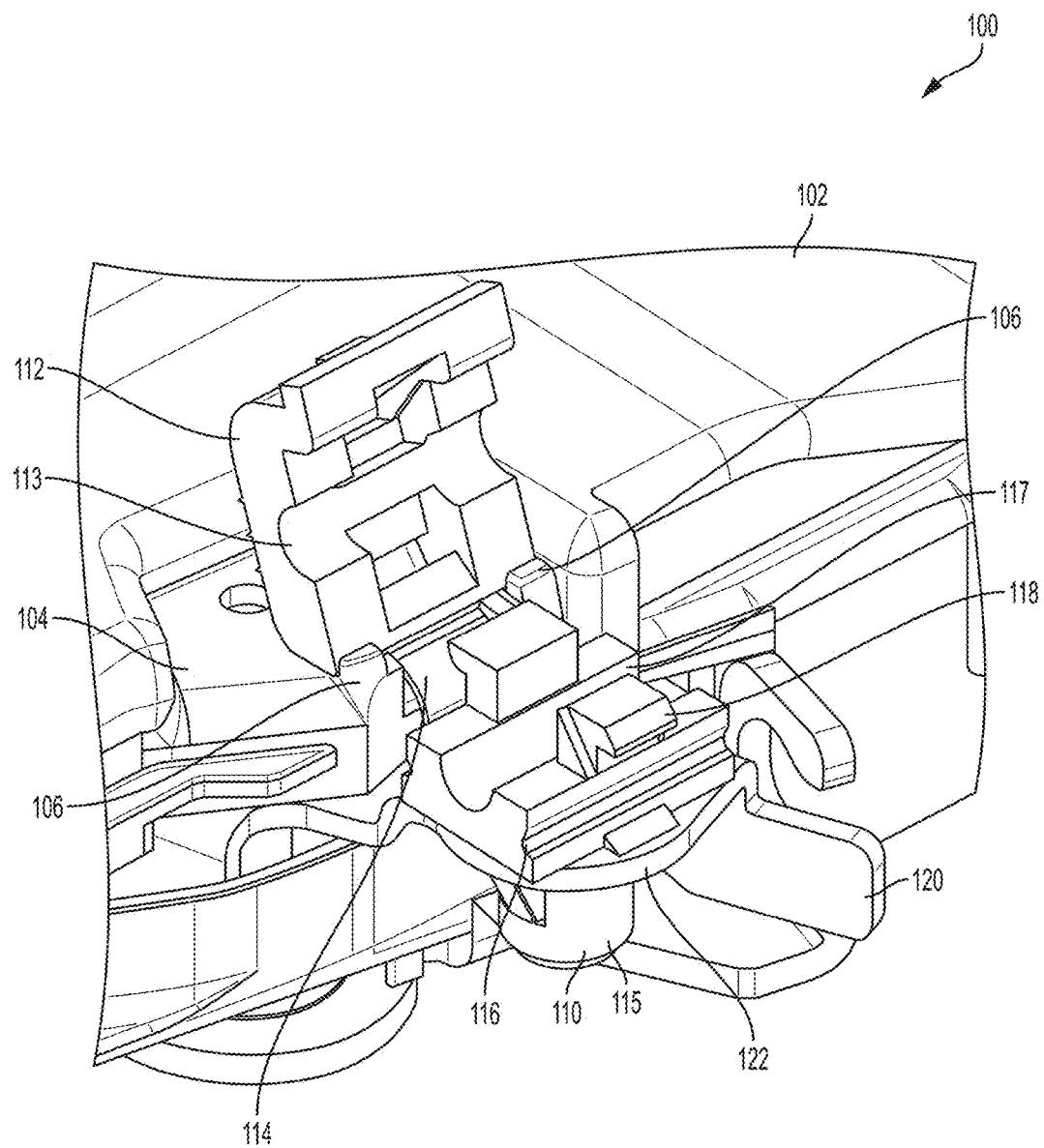
FIG. 1 is a pictorial view of an adjustment rod assembly in accordance with this disclosure.

Referring to the drawings, FIG. 1 shows the adjustment rod assembly 100. In the illustrated embodiment, the adjustment rod assembly 100 includes a lever 120, an adjustment rod clip 110, and a cover 102. In the illustrated embodiment, features of the cover 102 can temporarily retain the adjustment rod clip 110 during assembly to prevent rotation of the adjustment rod clip 110 and prevent inadvertent movement of the lever 120. Advantageously, by temporarily retaining the adjustment rod clip 110, installers can avoid re-aligning the adjustment rod clip 110 during assembly.

Figure 2:
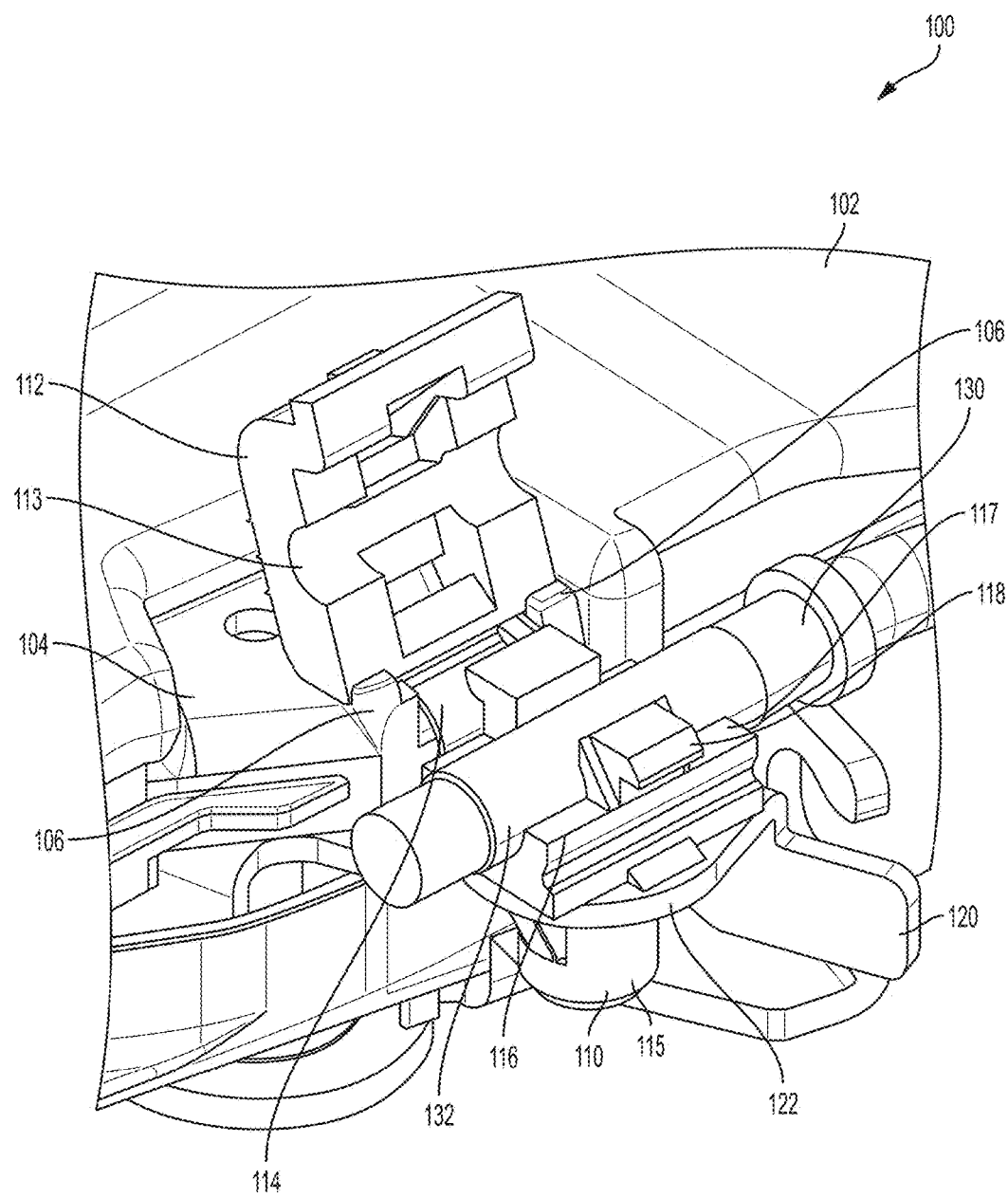
FIG. 2 is a pictorial view of an open adjustment rod assembly of FIG. 1 receiving an adjustment rod.
Figure 3:
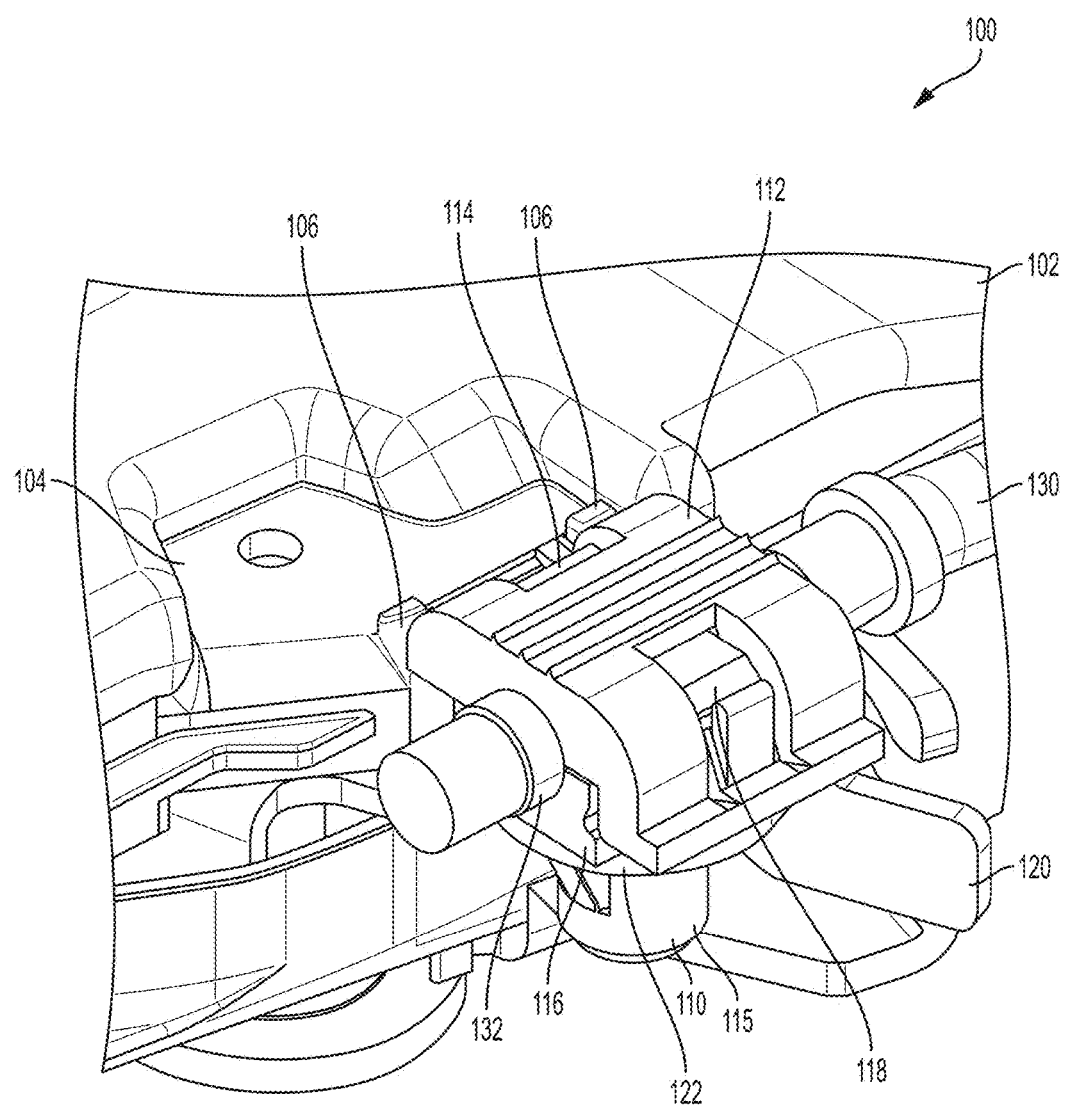
FIG. 3 is a pictorial view of the adjustment rod assembly of FIG. 2 in a closed position.

In the illustrated embodiment, the lever 120 can be utilized to actuate or adjust a mechanism within the cover 102. In certain the embodiments, the lever 120 can actuate a release mechanism within the door of a vehicle outside handle. In the illustrated embodiment, the lever 120 can be actuated by a user via an adjustment rod 130, as shown in FIGS. 2 and 3. In the illustrated embodiment, the lever 120 can be rotated or otherwise translated by the movement of the adjustment rod 130. In the illustrated embodiment, the lever 120 is coupled to the adjustment rod 130 by an adjustment rod clip 110. In the illustrated embodiment, the adjustment rod clip 110 can be received by the lever 120 via a clip receiving body 122 of the lever 120. Movement from the adjustment rod 130 can be translated to the lever 120 via the adjustment rod clip 110 disposed within the clip receiving body 122.

In the illustrated embodiment, the adjustment rod clip 110 can receive the adjustment rod 130 (FIGS. 2 and 3) and translate motion of the adjustment rod 130 to the lever 120. In the illustrated embodiment, the adjustment rod clip 110 includes a top portion 112, a bottom portion 116, a clip connector 114, and a locking feature 118. In the illustrated embodiment, the adjustment rod clip 110 can be open to facilitate assembly and receive the adjustment rod 130. In the illustrated embodiment, the adjustment rod clip 110 may rotate within the clip receiving body 122. In the illustrated embodiment, the adjustment rod clip 110 can be formed from a polymeric material.

In the illustrated embodiment, the bottom portion 116 can include a lower channel 117 and a clip extension 115. In the illustrated embodiment, the bottom portion 116 can receive the adjustment rod 130 in the lower channel 117. The lower channel 117 can be formed to create an interference fit with the adjustment rod 130. In the illustrated embodiment, the bottom portion 116 includes a clip extension 115. In the illustrated embodiment, the clip extension 115 can extend through the clip receiving body 122 of the lever 120. The clip extension 115 can have a generally cylindrical shape to allow the clip extension 115 to rotate within the clip receiving body 122. Advantageously, the clip extension 115 can rotate within the clip receiving body 122 to allow the translation or other movement/change of position of the lever 120 without imparting rotational forces between the lever 120 and the adjustment rod clip 110.

In the illustrated embodiment, the top portion 112 can include upper channel 113. In the illustrated embodiment, the top portion 112 can be in an open position to allow for the adjustment rod 130 to be inserted or removed. Further, the top portion 112 can be in a closed position, wherein the top portion 112 is disposed on top of the bottom portion 116 to retain the adjustment rod 130. In the illustrated embodiment, the top portion 112 can receive the adjustment rod 130 in the upper channel 113. Similarly, the upper channel 113 can be formed to create an interference fit with the adjustment rod 130. In the illustrated embodiment, the upper channel 113 and the lower channel 117 can cooperatively retain the adjustment rod 130 when the top portion 112 is in a closed position. In the illustrated embodiment, the top portion 112 can be locked to the bottom portion 116 by utilizing a locking feature 118. The locking feature 118 can extend from the bottom portion 116 and retain a feature or opening of the top portion 112. The locking feature 118 can be selectively released to remove the adjustment rod 130.

In the illustrated embodiment, the top portion 112 can be connected to the bottom portion 116 of the adjustment rod clip 110 by a clip connector 114. In the illustrated embodiment, the clip connector 114 is a flexible portion of the adjustment rod clip 110 to allow the top portion 112 to remain attached to the bottom portion 116 when the top portion 112 is not engaged to the bottom portion 116. The clip connector 114 can retain the top portion 112 on one side of the bottom portion 116.

In the illustrated embodiment, the cover 102 can be utilized to protect a latch mechanism therein. In the illustrated embodiment, the cover 102 includes a recessed cover portion 104. The cover 102 can be formed from a polymeric material. The cover 102 can prevent dirt and debris from entering the mechanism within. In the illustrated embodiment, portions of the cover 102 are disposed adjacent to the adjustment rod clip 110.

In the illustrated embodiment, the recessed cover portion 104 can receive the top portion 112 and the clip connector 114 of the adjustment rod clip 110 when the adjustment rod clip 110 is in the open position. In the illustrated embodiment, the recessed cover portion 104 is recessed to allow for clearance and opening of the top portion 112.

In the illustrated embodiment, the recessed cover portion 104 can include at least one retaining feature 106. The retaining features 106 can be integrally formed with the cover 102. The retaining feature 106 can extend from the recessed cover portion 104.

In the illustrated embodiment, the retaining features 106 can extend upwardly from the cover 102 to prevent the rotation of the adjustment rod clip 110 when the adjustment rod clip 110 is open. In certain embodiments, the retaining features 106 can extend on either side of the clip connector 114 to prevent the rotation of the clip connector 114 and therefore, the adjustment rod clip 110. In certain embodiments, the retaining features 106 can extend on either side of the top portion 112 to prevent the rotation of top portion 112 and therefore, the adjustment rod clip 110. In certain embodiments, the retaining features can engage both the clip connector 114 and the top portion 112 to prevent rotation of the adjustment rod clip 110. Advantageously, the use of the retaining features 106 allows for a faster assembly process by preventing mistakes and allowing for proper alignment of the adjustment rod clip 110 during assembly.

Referring to FIG. 2, the adjustment rod assembly 100 is shown during the assembly process. During the assembly process, the adjustment rod 130 is placed within the bottom portion 116 of the adjustment rod clip 110. In the illustrated embodiment, an adjustment rod interface portion 132 can interface with the lower channel 117 to fit within the bottom portion 116 of the adjustment rod clip 110. Advantageously, the retaining features 106 of the cover 102 prevent the inadvertent rotation or translation of the adjustment rod clip 110 and the lever 120 during the placement of the adjustment rod 130.

Referring to FIG. 3, the top portion 112 can be closed over the bottom portion 116 to close the adjustment rod clip 110 with the adjustment rod 130 retained therein. The adjustment rod 130 can be retained by the upper channel 113 of the top portion 112. The top portion 112 can be locked into place by the locking feature 118 of the adjustment rod clip 110. After the adjustment rod clip 110 is closed, the top portion 112 and/or the clip connector 114 is not retained by the retaining features 106. Therefore, the adjustment rod clip 110 is free to move and rotate with the adjustment rod 130 as well as freely translate the lever 120.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. In combination a cover and an adjustment rod assembly for a vehicle latch, the adjustment rod assembly comprising:
   an adjustment rod clip with a top portion, a bottom portion, and a clip connector coupling the top portion and the bottom portion;
   a lever to rotatably receiving the bottom portion of the adjustment rod clip;
   the cover having a recessed cover portion and a pair of retaining features integrally formed with the cover, the pair of retaining features receiving the top portion of the adjustment rod clip when the adjustment rod clip is in an open position and the pair of retaining features prevent rotation and translation of the adjustment rod clip by engaging the top portion of the adjustment rod clip when the adjustment rod clip is in an open position.

2. The combination of claim 1, wherein the pair of retaining features prevent movement of the lever via engagement of the adjustment rod clip when it is in an open position.

3. The combination of claim 1, wherein the cover is formed from a polymer.

4. The combination of claim 1, wherein the pair of retaining features are a plurality of retaining features.

5. The combination of claim 1, wherein the pair of retaining features engage the clip connector of the adjustment rod clip when it is in the open position.

6. The combination of claim 1, wherein the adjustment rod clip receives an adjustment rod.

7. The combination of claim 6, wherein the bottom portion of the adjustment rod clip receives an adjustment rod interface portion of the adjustment rod.

8. The combination of claim 6, wherein the bottom portion of the adjustment rod clip engages the top portion of the adjustment rod clip to retain the adjustment rod.

9. The combination of claim 8, wherein the bottom portion of the adjustment rod clip engages the top portion of the adjustment rod clip via a locking feature.

10. The combination of claim 8, wherein the pair of retaining features prevent movement of the lever via engagement of the adjustment rod clip when it is in an open position.

11. The combination of claim 6, wherein the cover is formed from a polymer.

12. The combination of claim 6, wherein the pair of retaining features are a plurality of retaining features.

* * * * *